July 22, 1958 C. E. JAHNIG 2,844,521
HIGH TEMPERATURE COKING FOR CHEMICAL PRODUCTION
Filed Oct. 23, 1952
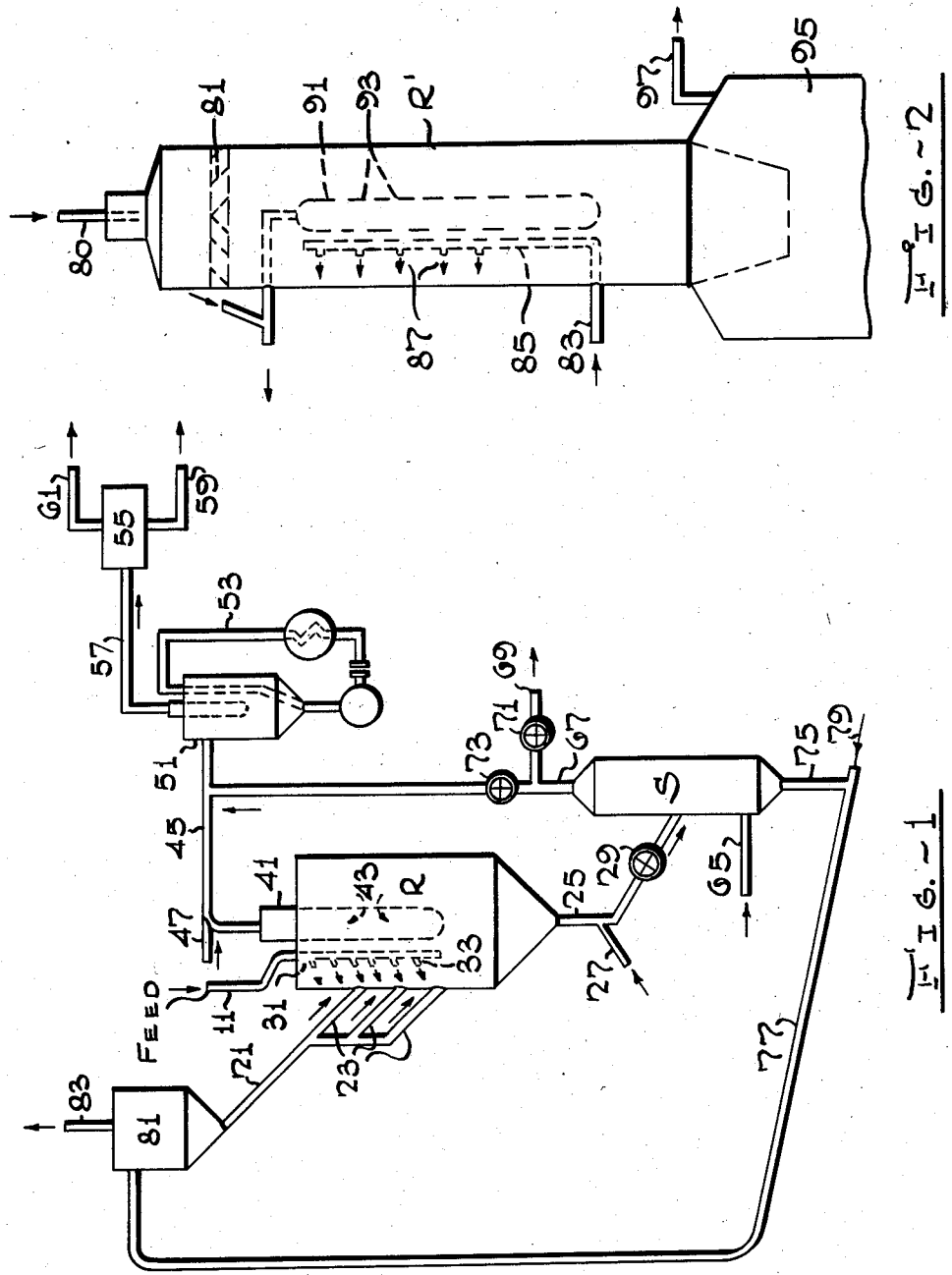
Charles E. Jahnig Inventor
By Edwin M. Thomas Attorney

United States Patent Office

2,844,521
Patented July 22, 1958

2,844,521

HIGH TEMPERATURE COKING FOR CHEMICAL PRODUCTION

Charles E. Jahnig, Red Bank, N. J., assignor to Esso Research and Engineering Company, a corporation of Delaware Application October 23, 1952, Serial No. 316,382

4 Claims. (Cl. 196—52)

The present invention relates to high temperature coking for chemical production and relates particularly to a process and apparatus or system for obtaining a short and controlled time of contact between finely subdivided and highly heated solid particles and finely divided droplets of mildly preheated liquid such as oil or the like. The invention pertains more particularly to means by which the heat contained in products of a coking process is more effectively utilized and at the same time excessive coking or degradation of products is avoided.

In the prior art numerous attempts have been made to devise efficient processes for the production of aromatic compounds and other chemicals from petroleum residual oils. It has already been suggested to produce such chemicals by subjecting the residual oils obtained from reduced crude petroleum to momentary contact with highly heated solid particles. The contact time between the solids and the fluids must be carefully controlled to avoid excessive cracking of the primary products. Also, the products must be quickly quenched as they leave contact with the solids, to prevent undesirable polymerization, etc.

According to the present invention a stream of finely divided solids of appropriate particle size, for example between 20 and 1000 microns average diameter, preferably 100 to 500 microns, is caused to travel in a circumferential path about the periphery of a reaction zone. A stream of finely divided oil particles, preheated enough for convenient atomization or spraying, is directed into the circumferential flowing stream of solid particles which are at a much higher temperature. Preferably the residual oil is heated to a temperature between 400° and 700° F., a temperature of about 500° F. being normally satisfactory. The solids, on the other hand, are heated to a temperature of at least 1000° F., a suitable temperature range being from 1200° up to 1700° F., the range of 1300° to 1500° F. ordinarily being most suitable.

As the mildly heated oil droplets contact the highly heated catalyst particles they are quickly transformed into vaporous products. Unless quenched very quickly these vaporous products deteriorate to low molecular weight gases and other products in undesirable proportions.

According to the present invention these products are withdrawn countercurrent to the oil spray, to the central axis of the reactor where they are taken out of the system. This countercurrent flow not only quenches the reaction products very quickly but it also serves to preheat the incoming mildly heated oil to a much higher temperature, thereby making efficient use of the heat in the products leaving the solid particles.

The solid particles, according to the present invention, flow around the reactor downwardly and are withdrawn from the reactor through a suitable outlet which may, if desired, be a fluidized standpipe line, a stripping gas being passed upwardly in countercurrent to the solids to remove occluded gases and vapors, if desired. The solids ordinarily are taken to a stripping zone where they are further stripped of gases and vapors or vaporizable materials. From the stripper the solids may be discarded, although preferably they are returned through a heating line where they are brought back up to a temperature suitable for re-use in the reactor. A combustion gas may be fed to this reheater line to burn off carbon and other deposits on the solids and to reheat them to the desired temperature. The solids are preferably passed through a suitable separator such as a cyclone, where they are freed from combustion and other gases and then they are returned to the reactor to repeat the cycle.

According to another aspect of the invention the products as they are withdrawn from the central axial zone of the reactor are quenched, cooled, and fractionated. The heat remaining in the products may also be used by passing them through a suitable heat exchanger where they are used to preheat the feed or for other heat requirements.

According to still another phase of the invention, the circumferential or peripheral flow of the solids, by which they are held around the outer portion of the reaction zone by centrifugal force, may be caused by introducing the stream through baffles which direct the particles toward the periphery. Thus, it will be seen that the invention contemplates broadly the use of any means by which the preheated solids may be constrained to flow around the outer periphery of the reaction zone in such a manner that the feed is sprayed outwardly toward the particles in countercurrent flow to the reaction products which are withdrawn from the solids to the center or axial portion of the reactor.

Reference will next be made to the annexed drawing showing a preferred modification of the invention, wherein Fig. 1 is a schematic elevational view of an apparatus or system embodying the invention and designed for carrying out the process thereof, and Fig. 2 is a fragmentary elevational view, with parts broken away, of a modified reactor for use in the invention.

The system or apparatus shown in Fig. 1 comprises a feed line 11 for feeding a mildly preheated oil stock into the system. The oil, which is preferably a reduced crude or petroleum residue, although it may be an oil obtained from shale or from coal, or from synthetic processes, is preheated to a temperature of about 400° to 600° F. by any suitable preheating means, not shown. It is desirable, of course, that preheating be accomplished by making use of heat in the product or product vapors, as is conventional practice, but other means and methods of heating may be employed if desired.

The preheated feed introduced through line 11 enters a reactor R which is so arranged, as mentioned more fully below, that a circulating stream of hot finely divided solid particles flows circumferentially about its outer periphery. As shown in Fig. 1, the reactor is preferably of the cyclone type, so arranged that a stream of preheated solids supplied from a line 21, which may enter more or less tangentially and at substantial velocity through one or preferably a plurality of nozzles 23 into reactor R. These solids, preferably preheated to at least 1000° F., travel around inside the reactor and downwardly until they are withdrawn through a line 25. This line 25, if desired, may be supplied with a stripping or aeration gas through a gas line 27, and may, if desired, also be of standpipe design to hold a mass of solids in fluidized state, thus forming a pseudo hydraulic head. In this case a valve 29 may be provided to control the outflow of the solids to a stripper S.

The oil feed, mildly preheated, is supplied through a manifold 31 having a plurality of openings or preferably nozzles 33 through which a spray of the oil may be directly tangentially, or outward toward the periphery of the reaction zone R. This manifold is located as near as may be convenient, in view of other apparatus, to the central vertical axis of the reaction zone. The oil is fed under such pressure and the nozzles or openings 33 are preferably of such design that the oil is atomized to droplets of 20 to 200 microns average diameter and propelled at velocities of 50 to 200 feet per second. A velocity of about 80 to 125 feet per second through a distance (from outlet to reactor periphery) of about 2 to 5 feet, may be used, for example. The oil is preferably sprayed in a direction having a tangential component to increase swirling and to improve contact with the hot solid particles which are preferably at much higher temperature.

This short contact time, which is preferably not more than 1 sec., between highly heated solid particles of appropriate size (20 to 1000 microns, preferably 50 to 200) and the oil converts the oil to unsaturates, aromatics, etc., as is well known in the art. The oil itself is raised in temperature substantially during its short flow from the nozzles to the periphery, and the reaction products returning to the outlet in countercurrent flow are quenched by contact with the spray.

The outlet consists of a perforated tubular conduit 41 arranged more or less axially of the reactor or reaction zone. It is provided with a plurality of perforations or openings 43, preferably so spaced and arranged as to cause the outflowing gaseous and vaporous products to make maximum contact with the sprayed oil feed. From tube or conduit 41 the products pass through a line 45, into which a quenching fluid may be introduced as through line 47 for further cooling. Quench fluid may also be added to zone 41 if desired by means not shown. The quenched products are then passed into a cyclone 51 for separation of entrained liquid and/or solid particles, and this may be combined with heat exchanger means 53 by which the heat in the products may be utilized. From the heat exchanger and/or the cyclone, the products are taken to a separator 55 through line 57, where liquid and gaseous products may be withdrawn through lines 59 and 61, respectively. Further fractionation and separation may be accomplished by conventional means and processes, as known in the art, e. g., fractionation, adsorption, extraction, etc.

The solids withdrawn from the reaction zone R are taken to a stripper S, as previously mentioned. Here they may be stripped of hydrocarbon and other gases, vapors and vaporizable materials. A stripping gas such as steam or suitable hydrocarbon vapor may be supplied through a line 65 and the stripped products are removed overhead through a line 67. They may be taken to a suitable recovery apparatus, not shown, through a side line 69 or they may be combined with the products in line 45, as desired. Suitable valves 71 and 73 are provided to control the disposition of the stripped gases and vapors.

The stripped solids are withdrawn from stripper S through line 75 and passed into a transfer line 77. Air or other gas for promoting combustion may be supplied to this line through an inlet 79. This permits combustion of deposits of coke and other residue on the solids and reheating of the solids for recirculation, all in the transfer line. Also, liquid or gaseous fuel can be added to the transfer line 77 when desired. The solids could, if desired, be passed to a conventional regenerator, e. g., of the fluid bed type, but reheating in the transfer line is simpler and is presently preferred.

From the reheater and transfer line 77 the solids, now brought back to a temperature range of 1000 to 1500° F., or higher, are passed through a cyclone 81 to separate the gases of combustion, etc. The latter are taken overhead through an outlet 83 to a suitable flue or other disposal. Then the solids are returned to the reactor R as previously described and the cycle repeated. Hot solids from line 21 can be recycled to the inlet of transfer line 77, to promote combustion.

In Fig. 2 there is shown an alternative arrangement wherein the reactor R' may be of any conventional type, provided it is of circular cross section so that the solid particles may swirl or rotate around inside the outer wall and closely adjacent thereto. In this figure the reactor is provided with a set of directional vanes 81, so positioned and directed as to cause solid particles to spin toward the outer wall as they enter the reactor from line 80.

The oil feed, preheated as previously described, is fed in through line 83 to a manifold 85, located as near as practicable to the vertical axis of the reactor and equipped with spray nozzles 87, comparable to nozzles 33, previously described. The products are withdrawn through the axially arranged conduit 91, provided with inlet openings 93, comparable to those previously mentioned at 43, Fig. 1.

The spent solids may pass downwardly into a stripping zone 95, from which gaseous and/or vaporous or vaporizable materials may be withdrawn through a line 97. Alternatively, stripping may be accomplished as in Example I.

A specific application of this invention for a commercial plant will be described in detail. Feed consists of 16,000 B./S. D. of vacuum pitch from South Louisiana crude. The feed is 10.7° A. P. I. and 17% Conradson carbon. It is preheated to 500° F. and sprayed into the cyclone reactor which may be 4 ft. in diameter. Reaction is carried out at an average temperature of about 1300° F. for an effective contact time of 0.5 second. The products are then quenched to about 540° F. in the central collection manifold. Quench liquid can be added to the latter to supplement the cooling. The products are then further cooled and separated.

The heater operates at 1500° F. and consists of a transfer line 9.5 ft. in diameter giving a velocity of 60 ft./sec. Contact time in the burner is in the range 1–10 seconds. The air rate is 76,000 cubic feet per minute. Solids from the heater are circulated to the reactor at a rate of 37.5 tons per minute. Product yields for this specific case are given below.

| | |
|---|---|
| $C_3-$, Wt. Percent | 35 |
| Temperature, °F | 1300 |
| Product Yields, Wt. Percent: | |
| Non-hydrocarbon gas | 0.9 |
| $H_2$ | 0.6 |
| $CH_4$ | 10.6 |
| $C_2H_4$ | 9.3 |
| $C_2H_6$ | 4.6 |
| $C_3H_6$ | 8.3 |
| $C_3H_8$ | 0.7 |
| $C_4H_6$ | 1.4 |
| $C_4H_8$ | 3.7 |
| $C_4H_{10}$ | 0.3 |
| $C_5$–430° F. (ex benzene) | 15.5 |
| Benzene | 2.5 |
| 430–650° F | 6.6 |
| 650° F. + (incl. coke) | 35.0 |

The system can also be used for processing shale, coal, bitumen or other carbonaceous materials. In some cases the processing of coal is particularly advantageous since this results in the production of a high percentage of aromatic products (e. g. benzene, toluene, etc.). The process is such that heavy tar is largely recycled within the reactor so that it is cracked down to more valuable products. Lighter products are not so recycled but are withdrawn and quenched immediately after formation. This improves the yield of valuable and highly reactive products from cracking, such as olefins, diolefins, resin forming compounds, etc.

Retorting of shale is ordinarily complicated by the fact that the shale disintegrates. This gives fine particles which are not well suited for use in a fluid bed reactor. In the present design the reactor consists of a cyclone wherein centrifugal force holds the shale particles to the walls of the vessel so that excessive entrainment does not occur. However, vapor products are readily removed from the outlet. A high retorting temperature can be used to reduce the size of the equipment, and the short time avoids excessive cracking. The high temperature results in gasoline of very high octane number, and high yields can be obtained by adjusting the cracking conditions.

In some cases the spent shale will not be of the desired size for recycling through a heating zone. If preferred, coarse sand, coke, shot or other extraneous material may be circulating to supply heat to the reactor.

It will be understood that the solids used to transfer heat and facilitate conversion to chemicals may be of various types. They may be inert, such as particles of coke, sand, silica, alumina and the like, for simple heat transfer. If desired, catalytically active solids may be employed and these may be of the activated type, or the the supported catalyst type, such as those having compounds of chromium, copper, iron, cobalt, nickel, vanadium, molybdenum, tungsten, etc., on a support such as silica, alumina, etc.

Modern petroleum processes generally use catalyst, since this allows controlling the reactions to give better selectivity than can be obtained by simple thermal cracking. Up to the present, catalysts have not been applied in the field of high temperature cracking of oils for chemical production. The reason for this is that the rate of thermal reaction is so fast that present equipment designs cannot reduce the contact time to a point where catalysts can be effective, thus the usual thermal cracking furnace gives somewhat higher conversion than optimum.

With the present invention contact time can be reduced to considerably less than 0.5 second, to reduce thermal reactions to a low level. Addition of a catalyst then becomes practical. For example, a dehydrogenation catalyst such as one containing iron, nickel, copper or chromium may be used to enhance the yields of olefins and diolefins. Also, an aromatization catalyst may be used, for example, one containing chromium, molybdenum, platinum, etc. When using catalyst the solids from the reactor will be passed to a regenerator to burn off carbonaceous deposits. The feed, of course, should not contain excessive amounts of compounds which would contaminate or deactivate the catalyst.

The choice of catalyst or inert solid will depend on the type of feed stock, the type of reaction products desired, and operating temperatures and pressures, as is well understood in the art.

Other modifications may be made as will readily be apparent to those skilled in the art and it is intended to cover such obvious variations and all those equivalents which the state of the art permits, within the scope of the following claims.

While the foregoing description deals with application of the invention to relatively viscous products such as hydrocarbon oil residues, and to retorting solids such as coal and oil shale, it will be understood that the invention is applicable also to conversion, cracking or reforming of relatively light hydrocarbon oils and the like, e. g. gas oil, naphtha, etc. The light oil may be sprayed, with or without preheating, from the central area into the circulating preheated solids around the periphery of a reaction zone, the conversion products being withdrawn to the central area in counterflow to the spray to effect quick and effective heat exchange and quenching.

What is claimed is:
1. A process for converting a volatilizable material which comprises preheating particulate solids to above 1000° F., introducing solids so preheated with a tangential component of motion and at a substantial velocity into an elongated vertical reaction zone of circular cross-section, flowing said particulate solids around the periphery of said reaction zone as a defined stream whereby the central portion of said reactor is substantially free of solids, spraying said volatilizable material from points along a longitudinal discharge line within the central area of said reaction zone radially outward against said particulate solids whereby said volatilizable material upon contact with the particulate solids evolves vaporous conversion products, radially withdrawing said vaporous conversion products from the periphery towards the central area of said reaction zone through a longitudinally elongated collection zone in the said central area whereby said vaporous conversion products and said volatilizable material undergo intimate countercurrent heat exchange, passing the vaporous conversion product so withdrawn to a recovery zone and withdrawing spent particulate solids from the lower portion of said reaction zone.

2. The process of claim 1 wherein said volatilizable material comprises finely divided carbonaceous solids such as oil shale and coal.

3. The process of claim 1 wherein said volatilizable material comprises relatively light distillate petroleum oils such as gas oils and naphthas.

4. A process for producing chemical products from hydrocarbon oil residue which comprises introducing a stream of particulate contact solids having a particle size within the range of 20 to 1000 microns and preheated to a temperature in the range of 1200° to 1700° F. into a vertically elongated circular reaction zone with a tangential component of motion sufficient to cause the bulk of the solids to flow around the periphery of said reaction zone leaving the central portion thereof substantially solids-free, radially spraying a mildly preheated oil residue outwardly toward said periphery from points along a longitudinal discharge line in the central portion of said reaction zone, said oil residue being atomized to droplets having a size within the range of 20 to 200 microns and a velocity in the range of 50 to 200 ft./sec., whereby said oil residue contacts said preheated solids and evolves relatively lighter hydrocarbon vapors, the time of contact being not more than 1 second, withdrawing said vapors from a vertically elongated central portion of said zone in counterflow to the injected oil residue whereby said oil residue is preheated and said vapors are quenched, withdrawing spent solids from the lower portion of said reactor, stripping the solids so withdrawn, reheating the stripped solids and returning the solids so reheated to the reaction zone.

References Cited in the file of this patent

UNITED STATES PATENTS

| | | |
|---|---|---|
| 2,231,231 | Subkow | Feb. 11, 1941 |
| 2,303,717 | Arveson | Dec. 1, 1942 |
| 2,320,562 | Bransky | June 1, 1943 |
| 2,362,270 | Hemminger | Nov. 7, 1944 |
| 2,366,805 | Richker | Jan. 9, 1945 |
| 2,374,518 | Wolk et al. | Apr. 24, 1945 |
| 2,394,651 | Alther | Feb. 12, 1946 |
| 2,488,493 | Evans | Nov. 15, 1949 |
| 2,546,042 | Oberfell et al. | Mar. 30, 1951 |
| 2,683,109 | Norris | July 6, 1954 |
| 2,688,588 | Beam | Sept. 7, 1954 |